Sept. 6, 1966  J. A. FREED  3,270,708
STEERING WHEEL TURN INDICATOR
Filed Aug. 23, 1965
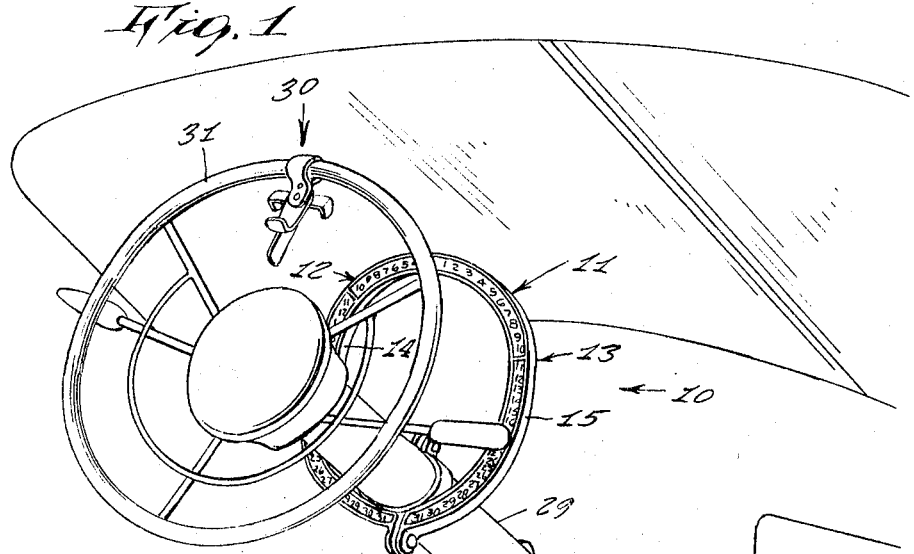
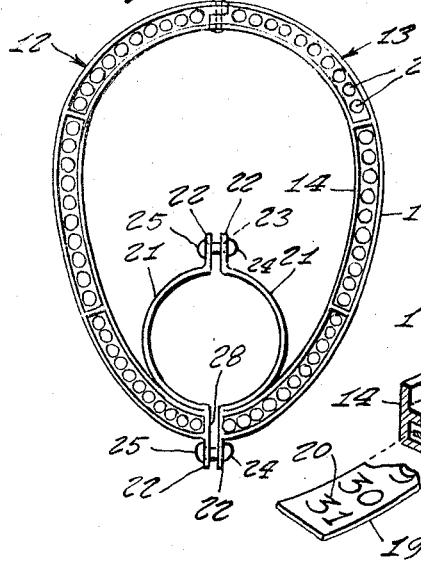
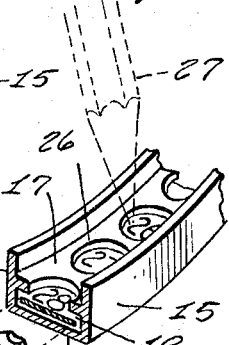
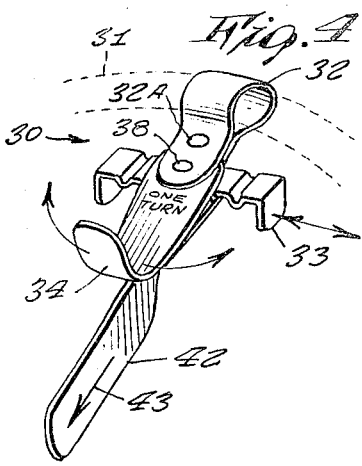
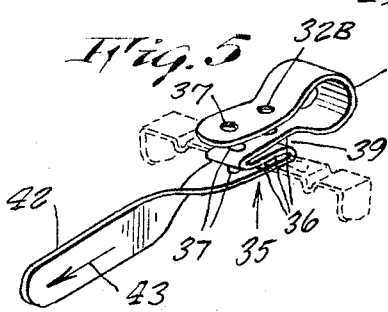
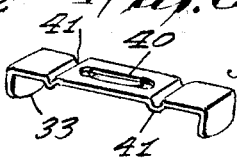
INVENTOR
JOSEPH A. FREED United States Patent Office 3,270,708
Patented Sept. 6, 1966

3,270,708
STEERING WHEEL TURN INDICATOR
Joseph A. Freed, 849 Beck St., Bronx, N.Y. 10459
Filed Aug. 23, 1965, Ser. No. 481,461
2 Claims. (Cl. 116—31)

This invention relates generally to steering wheel accessories. More specifically it relates to a steering wheel turn indicator.

It is well known that at times a motorist does not know the direction of the automobile front wheels especially during curb parking operation between crowded cars when excessive maneuvers with the steering wheel are required. This is objectionable as he must move his vehicle to ascertain the direction in which the wheels are turned.

Accordingly it is an object of the present invention to provide a steering wheel turn indicator which will indicate at all times to the motorist the direction in which the front wheels are turned.

Another object is to provide a turn indicator having means to indicate the amount of turning of the steering wheel.

Another object is to provide a turn indicator that can be easily secured to a steering post of a vehicle without requirement of tools.

Other objects are to provide a turn indicator that is simple in design, easy to manufacture, rugged in construction, easy to use and efficient in operation.

These and other objects will be readily evident upon a study of the following specification and accompanying drawing wherein:

FIGURE 1 is a perspective view of the turn indicator secured to an automobile steering post.

FIGURE 2 is a front view of a modified form of the invention.

FIGURE 3 is an enlarged fragmentary perspective view thereof.

FIGURE 4 is a perspective view of an associate element of the present invention.

FIGURE 5 is a perspective view of a part thereof, and

FIGURE 6 is a perspective view of another part thereof.

Referring now to the drawing in detail the numeral 10 represents a steering wheel indicator according to the present invention wherein there is an ellipsoidal main body 11 comprised of a left and right body element 12 which are secured pivotally together by a pin 13 at one end. The body elements are made of transparent plastic preferably, and include a pair of side walls 14 and 15, a bottom wall 16 and an upper wall 17 between the side walls, which forms a pocket 18 between the bottom and intermediate wall for receiving therein a plastic arcuate shaped dial 19 having numerals 20 imprinted thereupon in radium or other luminous paint.

At their other ends each body element has a semi-circular ring 21 integrally formed therewith and a lug 22 at each end of the ring. Each lug has an opening 23 for receiving a bolt 24 therethrough upon which a cap nut 25 is secured.

In a modified form of the invention an opening 26 in the upper wall 17 permits a pencil 27 to have access for writing upon the dial. As shown in FIGURES 1 and 3, the dial should preferably have 31 numerals to indicate radial directions and also to indicate days of a month. Thus the motorist can mark reminders thereupon for future use. The dial is removable out of the end 28 of the body element for erasing or replacement.

The main body is secured to a steering post 29 clamped between the components of ring 21.

An associate member 30 is clamped over the top center of the steering wheel 31. It comprises a clamp 32, a slide lever 33, and turn lever 34.

The clamp 32 is secured to the wheel by a screw 32A passing through openings 32B on the clamp. The clamp has a Z-shaped central portion 35 through each arm 36 of which there is an opening 37 to receive a screw 38. The slide lever is fitted into a space 39 between two of the arms 36, the slide lever having a slot 40 through which screw 38 extends. A detent or groove 41 at each end of the slot provides functional retaining of the slide lever between arms 36 when moved right or left. The opposite end of the clamp 32 has a straight extension 42 with arrow 43 imprinted thereupon, the extension designating to the motorist that the wheels are pointing forward when the extension is at the top of the steering wheel as shown in FIGURE 1.

In operative use, when the steering wheel is turned, the extension will point to one of the numerals 20 to inform the motorist the relative amount of turn of the front wheels. In some cars the steering wheel is geared to turn fully around more than once when turning the wheels. In such cases the motorist flips the lever 34 in the direction of the turn after he has completed one turn of the steering wheel to remind him that the numerical reading of extension 42 should include an additional full turn in his computation. The lever 33 is moved to indicate direction of all turns whether more or less than a full turn.

While various changes may be made in the detail construction such changes will be confined to the scope of the claims.

I claim:
1. In a steering wheel turn indicator the combination of a transparent main body of ellipsoidal configuration comprised of a right and left body element, each of said body elements having a semi-ellipsoidal bowed portion between opposite ends, each of said body elements having one of their said ends pivotally secured together, a semi-circular ring component adjacent the other of said ends on each said body element, said semi-circular ring components together forming a ring when said body elements are assembled together to form said main body; said ring having a central opening for receiving an automobile steering post therethrough, each said ring component comprising a semi-circular portion between opposite ends formed into lugs supporting nut and bolt means for frictional securement of said ring around said automobile steering post, and radial indication means on said main body, said radial indication means comprising a pair of side walls, a bottom wall and an upper wall between an intermediate part of said side walls, said walls forming each said semi-ellipsoidal bowed portions, said walls enclosing a semi-ellipsoidal pocket, a removable semi-ellipsoidal dial within each of said pockets, numerical designations on said dials, an opening through said upper walls over each said numerical designation, and an associate member secured to an automobile steering wheel, said member comprising a clamp, a slide lever and turn lever, said clamp having an extension with an arrow imprinted thereupon for radially aligning said member with one of said numerical designations to indicate to a driver the directional angle of the automobile front wheels.

2. The combination as set forth in claim 1 wherein said clamp comprises a generally U-shaped member having an arcuate portion for being received around the edge of an automobile steering wheel and end portions, a first of which has said extension, said clamp having a Z-shaped portion between the said first end portion and said extension, said Z-shaped portion being comprised of three arms, openings through said arms and through the second said end portion, a pair of screws through said openings, one of said screws for securing said end portions together for frictional clamping around said steering wheel edge, the other of said screws extending through a slot in said slide member, said slide member being positioned between two adjacent said arms and being transversely slidable therebetween to indicate a right or left turn, and said turn lever comprising a leg pivotally mounted at one end on the last said screw to indicate a direction in which a steering wheel has been turned more than one complete revolution.

References Cited by the Examiner

UNITED STATES PATENTS

| | | | |
|---|---|---|---|
| 1,200,443 | 10/1916 | Friede | 248—230 |
| 1,431,797 | 10/1922 | Hess | 116—31 |
| 2,079,175 | 5/1937 | Kemp | 116—31 |
| 2,175,637 | 10/1939 | Pauli | 116—31 |
| 2,377,560 | 6/1945 | Kulling | 248—230 |

FOREIGN PATENTS 340,628    1/1931    Great Britain.

LOUIS J. CAPOZI, *Primary Examiner.*